United States Patent
Yin et al.

(10) Patent No.: US 11,558,396 B2
(45) Date of Patent: Jan. 17, 2023

(54) COMPUTER-IMPLEMENTED METHODS, SYSTEMS COMPRISING COMPUTER-READABLE MEDIA, AND ELECTRONIC DEVICES FOR TEAM-SOURCED ANOMALY VETTING VIA AUTOMATICALLY-DELEGATED ROLE DEFINITION

(71) Applicant: Mastercard International Incorporated, Purchase, NY (US)

(72) Inventors: Lidan Yin, Burlingame, CA (US); Naresh Gorantla, Belmont, CA (US); Dave Rogers, San Francisco, CA (US); Tristan Miano, Walnut Creek, CA (US); Thomas Hansen, San Francisco, CA (US)

(73) Assignee: Mastercard International Incorporated, Purchase, NY (US)

( * ) Notice: Subject to any disclaimer, the term of this patent is extended or adjusted under 35 U.S.C. 154(b) by 298 days.

(21) Appl. No.: 16/886,865

(22) Filed: May 29, 2020

(65) Prior Publication Data
US 2021/0377278 A1    Dec. 2, 2021

(51) Int. Cl.
*H04L 9/40* (2022.01)
*G06N 20/00* (2019.01)
*H04L 51/10* (2022.01)

(52) U.S. Cl.
CPC ........... *H04L 63/105* (2013.01); *G06N 20/00* (2019.01); *H04L 51/10* (2013.01); *H04L 63/1425* (2013.01)

(58) Field of Classification Search
CPC ....... G06N 20/00; H04I 63/1425; H04L 63/10
See application file for complete search history.

(56) References Cited

U.S. PATENT DOCUMENTS

| | | | |
|---|---|---|---|
| 2014/0282977 A1* | 9/2014 | Madhu | H04L 63/1408 726/7 |
| 2017/0142125 A1* | 5/2017 | Lim | H04L 63/10 |
| 2020/0233961 A1* | 7/2020 | Wolfin | G06F 21/566 |

* cited by examiner

*Primary Examiner* — Olugbenga O Idowu
(74) *Attorney, Agent, or Firm* — Hovey Williams LLP (57) ABSTRACT

A computer-implemented method for team-sourced anomaly vetting via automatically-delegated role definition. The method may include automatically determining that an event of the computing system corresponding to activity of an end user is anomalous. Based on the anomalous event, a permission store of the computing system may automatically be edited to include an access restriction on the end user, and a notification may be automatically generated and transmitted to one or both of the end user and another end user. The notification may provide access to an executable statement including code configured to be executed to remove the access restriction. A call to the executable statement by the other end user may be automatically received. Further, the permission store may be automatically edited to remove the access restriction on the end user.

20 Claims, 3 Drawing Sheets

COMPUTER-IMPLEMENTED METHODS, SYSTEMS COMPRISING COMPUTER-READABLE MEDIA, AND ELECTRONIC DEVICES FOR TEAM-SOURCED ANOMALY VETTING VIA AUTOMATICALLY-DELEGATED ROLE DEFINITION

FIELD OF THE INVENTION

The present disclosure generally relates to computer-implemented methods, systems comprising computer-readable media, and electronic devices for team-sourced anomaly vetting via narrowly-scoped elevated permissions.

BACKGROUND

Existing methods for combating excessive user access, external network threats, and other threats to the integrity of a database or computer system are either too blunt—essentially gathering up too many "false positives" and/or blindly prohibiting too much productive activity—and/or involve painstaking reviews by administrative personnel that are slow and expensive. A more efficient, less intrusive approach to preserving data integrity within an organization or elsewhere is needed.

This background discussion is intended to provide information related to the present invention which is not necessarily prior art.

BRIEF SUMMARY

Embodiments of the present technology relate to computer-implemented methods, systems comprising computer-readable media, and electronic devices for team-sourced anomaly vetting via automatically-delegated role definition. The embodiments may enable meaningful protections of data integrity for an organization, while minimizing the business impact on affected users.

More particularly, in an aspect, a computer-implemented method for team-sourced anomaly vetting via automatically-delegated role definition may be provided. The method may include automatically determining that an event of the computing system corresponding to activity of an end user is anomalous. Based on the anomalous event, a permission store of the computing system may be automatically edited to include an access restriction on the end user, and a notification may be automatically generated and transmitted to one or both of the end user and another end user. The notification may provide access to an executable statement including code configured to be executed to remove the access restriction. A call to the executable statement by the other end user may be automatically received. Further, the permission store may be automatically edited to remove the access restriction on the end user. The method may include additional, less, or alternate actions, including those discussed elsewhere herein.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

The Figures depict exemplary embodiments for purposes of illustration only. One skilled in the art will readily recognize from the following discussion that alternative embodiments of the systems and methods illustrated herein may be employed without departing from the principles of the invention described herein.

DETAILED DESCRIPTION

Existing automated methods for detecting and reacting to anomalous behaviors within a computer network include monitoring the network for such behavior and, upon identification, shutting down an associated end user's access until administrators have had an opportunity to investigate and clear continued access by the end user. This process is slow, expensive, and disruptive of normal business practices.

According to embodiments of the present invention, a technological mechanism is provided for narrowly-scoped delegation of administrative permissions relating to restricted-access data sources to working individuals of an organization. Such temporary and narrowly-confined elevated rights or permissions present an improved balance between maintaining system security and intruding on legitimate network access.

Exemplary System

Figure 1:
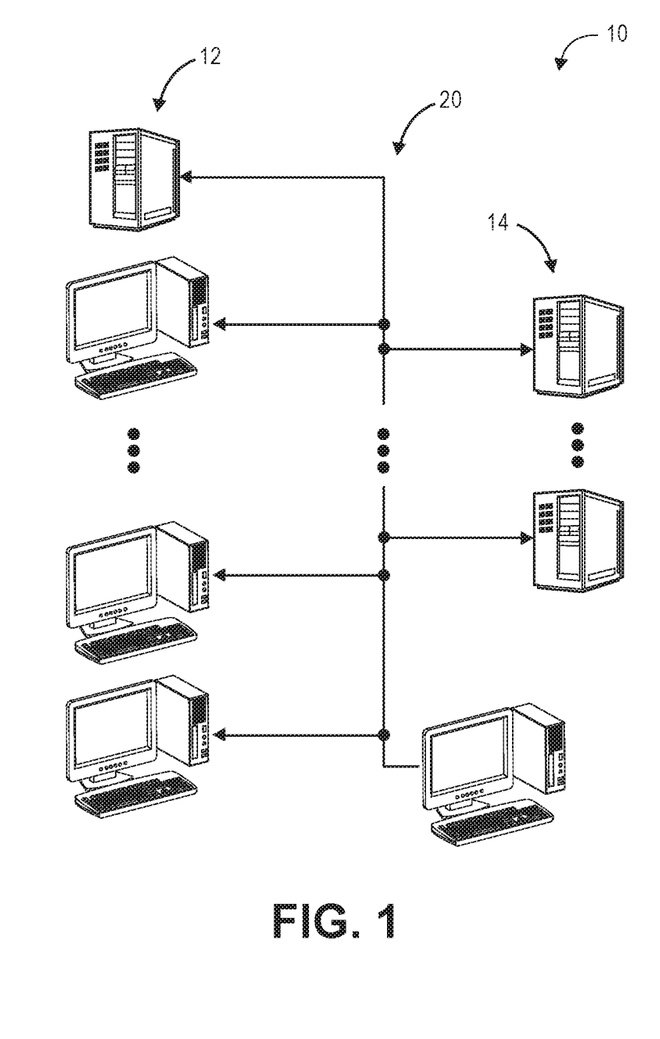
FIG. 1 illustrates various components, in block schematic form, of an exemplary system for team-sourced anomaly vetting via automatically-delegated role definition in accordance with embodiments of the present invention.

FIG. 1 depicts an exemplary environment 10 for team-sourced anomaly vetting via narrowly-scoped elevated permissions according to embodiments of the present invention. The environment may include a plurality of client devices 12, a plurality of servers 14, and a communication network 20. The client devices 12 and the servers 14 may be located within network boundaries of a large organization, such as a corporation, a government office, a university, a college, or the like. The communication network 20 may be at least conceptually internal to the organization, for example where the servers 14 manage restricted-access databases of the organization. Also or alternatively, the client devices 12 may access the servers 14 via transmissions, at least in part, across public/semi-public telecommunication network infrastructure, with the communication network 20 being at least in part comprised of such public/semi-public telecommunication network infrastructure.

The client devices 12 and servers 14 may therefore at least partly comprise a trusted internal network or the like. Alternatively or in addition, the client devices 12 and servers 14 may manage access to the servers 14 and/or restricted-access data sources under a common authentication management framework. Each user of a device 12, may be required to complete an authentication process to query restricted-access data sources via the servers 14.

In an embodiment, one or more client devices 12 may not be internal to the organization, but may be permitted access to perform the queries via the common authentication management framework. For instance, the common authentication management framework may comprise one or more servers running operating system software made available under WINDOWS® (a registered trademark of Microsoft Corporation) as of the date of initial filing of the present disclosure. In a preferred embodiment, the servers are configured to utilize WINDOWS® authentication credentials management in connection with processing stored procedures (in the case of SQL servers) or analogous database statements, as described in more detail below.

Moreover, all or some of the restricted-access data sources may be maintained and/or owned by the organization and/or may be maintained on the communication network 20 within the scope of the present invention. One of ordinary skill will appreciate that the servers 14 may be free of, and/or subject to different protocol(s) of, the common authentication management framework within the scope of the present invention.

Assets stored at restricted-access data sources and the servers 14 may include business intelligence (BI) data. BI data may inform users to enable them to improve operational efficiencies, products/services, marketing, customer retention, risk reduction, or the like on behalf of user organizations. For instance, the servers 14 may be maintained by a payment network organization, and an authenticated employee of a financial institution may access an exemplary system implemented on the servers 14 to query restricted-access data sources at the servers 14 and obtain customer transaction data to identify fraudulent activities. An employee of the payment network organization may also access such an exemplary system from a client device 12 to query the restricted-access data sources at servers 14 to identify fraudulent activities. One of ordinary skill will appreciate that embodiments may serve a wide variety of organizations and/or rely on a wide variety of data sources within the scope of the present invention.

The client devices 12 may be employee workstations or the like. A developer and/or administrator may also define access rights at one of the client devices 12 for provisioning user queries to restricted-access data sources via user applications or the like.

Figure 2:
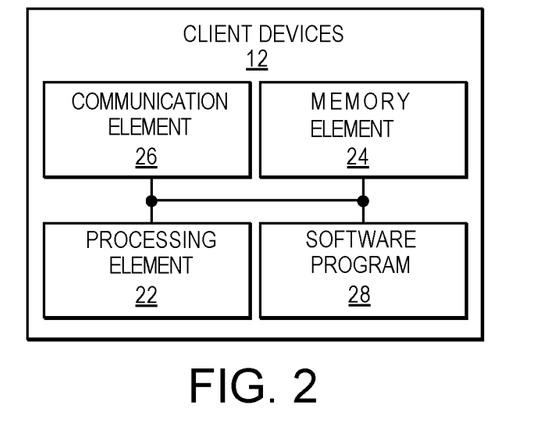
FIGS. 2 and 3 illustrate various components of exemplary computing devices shown in block schematic form that may be used with the system of FIG. 1.
Figure 3:
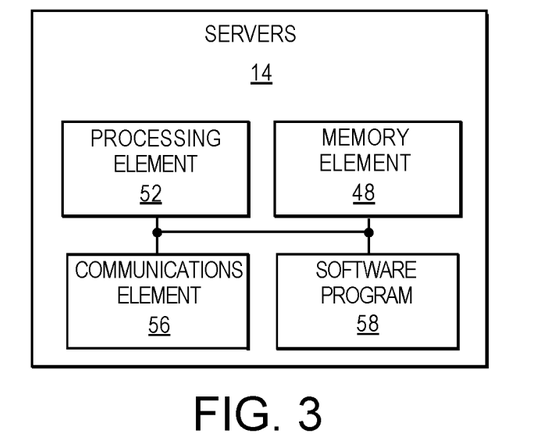

Turning to FIGS. 2-3, generally the client devices 12 may include tablet computers, laptop computers, desktop computers, workstation computers, smart phones, smart watches, and the like. In addition, the client devices 12 may include copiers, printers, routers and any other device that can connect to the communication network 20. Each client device 12 may include a processing element 22 and a memory element 24. Each client device 12 may also include circuitry capable of wired and/or wireless communication with the communication network 20, including, for example, a transceiver or communication element 26. Further, the client devices 12 may include a software application or program 28 configured with instructions for performing and/or enabling performance of at least some of the steps set forth herein. In an embodiment, the software program 28 comprises instructions stored on computer-readable media of memory element 24.

The servers 14 generally manage queries to, and responsive assets (e.g., resources including data, files and the like) received from, restricted-access data sources, and perform related functions. The servers 14 may comprise domain controllers, application servers, database servers, database web servers, file servers, mail servers, catalog servers or the like, or combinations thereof. In an embodiment, one or more restricted-access data sources may be maintained by one or more of the servers 14. Generally, each server 14 may include a memory element 48, a processing element 52, a communication element 56, and a software program 58.

The communication network 20 generally allows communication between the client devices 12 and the servers 14, for example in conjunction with the common authentication framework discussed above and/or secure transmission protocol(s), as well as in connection with data queries from the client devices 12. The communication network 20 may include the Internet, cellular communication networks, local area networks, metro area networks, wide area networks, cloud networks, plain old telephone service (POTS) networks, and the like, or combinations thereof. The communication network 20 may be wired, wireless, or combinations thereof and may include components such as modems, gateways, switches, routers, hubs, access points, repeaters, towers, and the like. The client devices 12 and/or servers 14 may, for example, connect to the communication network 20 either through wires, such as electrical cables or fiber optic cables, or wirelessly, such as RF communication using wireless standards such as cellular 2G, 3G, 4G or 5G, Institute of Electrical and Electronics Engineers (IEEE) 802.11 standards such as WiFi, IEEE 802.16 standards such as WiMAX, Bluetooth™, or combinations thereof.

The communication elements 26, 56 generally allow communication between the client devices 12, the servers 14, the communication network 20, and/or the restricted-access data sources. The communication elements 26, 56 may include signal or data transmitting and receiving circuits, such as antennas, amplifiers, filters, mixers, oscillators, digital signal processors (DSPs), and the like. The communication elements 26, 56 may establish communication wirelessly by utilizing radio frequency (RF) signals and/or data that comply with communication standards such as cellular 2G, 3G, 4G or 5G, Institute of Electrical and Electronics Engineers (IEEE) 802.11 standard such as WiFi, IEEE 802.16 standard such as WiMAX, Bluetooth™, or combinations thereof In addition, the communication elements 26, 56 may utilize communication standards such as ANT, ANT+, Bluetooth™ low energy (BLE), the industrial, scientific, and medical (ISM) band at 2.4 gigahertz (GHz), or the like. Alternatively, or in addition, the communication elements 26, 56 may establish communication through connectors or couplers that receive metal conductor wires or cables, like Cat 6 or coax cable, which are compatible with networking technologies such as ethernet. In certain embodiments, the communication elements 26, 56 may also couple with optical fiber cables. The communication elements 26, 56 may respectively be in communication with the processing elements 22, 52 and/or the memory elements 24, 48.

The memory elements 24, 48 may include electronic hardware data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory elements 24, 48 may be embedded in, or packaged in the same package as, the processing elements 22, 52. The memory elements 24, 48 may include, or may constitute, a "computer-readable medium." The memory elements 24, 48 may store the instructions, code, code segments, software, firmware, programs, applications, apps, services, daemons, or the like that are executed by the processing elements 22, 52. In an embodiment, the memory elements 24, 48 respectively store the software applications/program 28, 58. The memory elements 24, 48 may also store settings, data, documents, sound files, photographs, movies, images, databases, and the like.

The processing elements 22, 52 may include electronic hardware components such as processors. The processing elements 22, 52 may include microprocessors (single-core and multi-core), microcontrollers, digital signal processors (DSPs), field-programmable gate arrays (FPGAs), analog and/or digital application-specific integrated circuits (ASICs), or the like, or combinations thereof. The processing elements 22, 52 may generally execute, process, or run instructions, code, code segments, software, firmware, programs, applications, apps, processes, services, daemons, or the like. For instance, the processing elements 22, 52 may respectively execute the software applications/programs 28, 58. The processing elements 22, 52 may also include hardware components such as finite-state machines, sequential and combinational logic, and other electronic circuits that can perform the functions necessary for the operation of the current invention. The processing elements 22, 52 may be in communication with the other electronic components through serial or parallel links that include universal busses, address busses, data busses, control lines, and the like.

Queries may be initiated via user applications embodied, controlled and/or executed by a client device 12. In an embodiment, access to user applications and/or the client device 12 is granted via the common authentication framework outlined above, such as through known single sign-on (SSO) processes.

The restricted-access data sources hosted by the servers 14 may utilize a variety of formats and structures within the scope of the invention. For instance, relational databases and/or object-oriented databases may embody the data sources. One of ordinary skill will appreciate that—while examples presented herein may discuss specific types of operating systems and/or databases—a wide variety may be used alone or in combination within the scope of the present invention.

In a preferred embodiment, the software program 58 of one or more of the servers 14 may translate data from the common authentication management framework into identity information for use in connection with end user data source queries. In an embodiment, this includes translating a token (e.g., an SSO token) representing end user information into the identity information of the end user. The identity information may be used, for example, to determine the access rights enjoyed by the end user through reference to a permission store such as an access database and/or one or more authentication/authorization databases maintained by servers 14. One of ordinary skill will appreciate that a variety of user information may comprise and/or be used to generate the identity information within the scope of the present invention. It is foreseen that the program 58 may function in connection with a variety of common authentication frameworks without departing from the spirit of the present invention.

The program 58 may permit an administrator to grant user access to particular user applications and/or groups of user applications (i.e., "domains"). In an embodiment, the program 58 may be configured to at least partly manage the permission store, which may be stored in the memory element 48. The permission store may comprise and/or cooperate with aspects of the common authentication framework.

In an embodiment, the servers 14 may store user tables, active directory groups, tokens or the like and/or may at least partly maintain the permission store for associating and/or mapping users to roles, user groups and/or other groupings and managing access rights in connection with queries.

The permission store may comport with role-based access control, discretionary access control, mandatory access control, other access control strategies and/or combinations thereof without departing from the spirit of the present invention. One of ordinary skill will appreciate that various structures for maintaining access control lists, groupings and/or permissions carry unique advantages and disadvantages. For instance, role-based access control may permit more granular access control for groups of people, whereas access control lists may be superior where individuals tend to require unique access separate and apart from a definable role. Moreover, the maintenance and storage of such access management frameworks may be dispersed across various components of the platform of embodiments of the present invention and/or the servers 14 without departing from the spirit of the present invention. One of ordinary skill will appreciate that embodiments of the present invention may vary in the structure and disposition of access control mechanisms utilized for querying restricted-access databases.

In an embodiment, the permission store may include a plurality of records, each record being keyed to at least one of a user, a group of users, an application and/or a group of applications. Each record may also include fields defining relationships between the user(s) and/or application(s). Relationships between users may be defined at least in part by user group designation(s), such as where each user group is given a user group designation code and fields of records identifying members of the same user group are populated by the same user group designation code. Relationships between applications may be defined at least in part by application group designation(s), such as where each application group is given an application group designation code and fields of records identifying applications of the same application group are populated by the same application group designation code.

Identifiers corresponding to each user, user group, application and/or application group may populate the records of the permission store to define access relationships.

The program 58 may permit an administrative user to assign roles to users and/or user groups. A role may be defined to include users/user groups performing a job function and/or capacity, to include users/user groups having need of a type of access (e.g., "read only"), and/or may be otherwise defined according to a common characteristic. Generally, roles may correspond to user groups discussed above and/or may represent independent groupings without departing from the spirit of the present invention. For instance, a user may be in a user group referenced for purposes of defining broad-level application access rights and may be independently assigned one or more roles for purposes of defining data, report and/or tool access. Moreover, roles and user groups may be defined with respect to one another, such as where a plurality of user groups are assigned to a role, and/or where one or more roles are assigned to a user group, in each case providing a more efficient way of automatically exporting access rights for end users. Membership of a user within a user group may determine access to and use of a restricted-access data source more broadly, and assignment to a role may determine the data and/or data format(s) the user may access. The program 58 may permit a developer to group assets of one or more restricted-access data sources together and assign them to one or more role(s), thereby consolidating access definitions for the grouped assets under the assigned role(s).

An administrator and/or developer may utilize the program 58 to update access relationships for assets. The program 58 may receive administrator and/or developer selections and translate them for entry into the permission store of the servers 14 that governs the assets of the restricted-access data sources.

In a preferred embodiment, an administrator may construct statements or commands that automatically place blocks or restrictions on end user access if one or more criteria are deemed satisfied. For example, the servers 14 and the program 58 may maintain anomaly tracking records for each end user enrolled to access the data stored by the servers 14. Periodically or on a continual, rolling basis, the program 58 may evaluate system events, system logs, and/or network traffic for the presence of anomalies. The presence of an anomaly may trigger the block or restriction on an associated end user.

For instance, the program 58 may include routines or calls to associated program(s) configured to analyze one or more data elements from system logs and/or network traffic records for anomalous end user behavior. Anomalous end user behavior may be any behavior on the network that is indicative of inauthentic access, access exceeding normal work needs, abnormal access(es), unauthenticated access(es), or other undesired data access events.

The program 58 may utilize machine learning programs or techniques to perform the analyses outlined above. For instance, the program 58 may utilize the information from the data elements from system logs and/or network traffic records, and scrutinize that data using one or more machine learning techniques to generate one or more correlations or other relational observations. The program 58 and/or machine learning program(s) may therefore recognize or determine patterns and/or inconsistencies between expected or normal behavior on the one hand, and actual end user behavior on the other hand. The machine learning techniques or programs may include curve fitting, regression model builders, convolutional or deep learning neural networks, combined deep learning, pattern recognition, or the like. Based upon this data analysis, the program 58 and/or machine learning program(s) may flag anomalous behavior for automated blocking and/or further analysis as discussed in more detail below.

In supervised machine learning, the program 58 may be provided with example inputs (i.e., network behavior) and their associated outputs (i.e., anomalous or not anomalous), and may seek to discover a general rule that maps inputs to outputs, so that when subsequent novel inputs are provided the processing element may, based upon the discovered rule, accurately predict the correct output. In unsupervised machine learning, the program 58 may be required to find its own structure in unlabeled example inputs.

The program 58 may utilize classification algorithms such as Bayesian classifiers and decision trees, sets of pre-determined rules, and/or other algorithms to generate flags for anomalous behavior. Moreover, in a preferred embodiment, different and/or separately-trained algorithms and models are optimized for use in detecting respective types of anomalous behaviors.

Further, in a preferred embodiment, the program 58 is configured to generate confidence determinations in connection with each identified anomaly. That is, the program 58 may, based on analysis of network event information, generate a flag indicating that an anomalous event is likely to have occurred (e.g., an unauthorized access, a suspicious login, etc.), together with a confidence indicator providing a measure of how closely the analyzed event(s) fit with the model(s)/rule(s) used to identify the purported anomaly. For instance, where all considered facets of a network event (e.g., all data elements) nearly identically fit the profile of a definitive network attack by a bad actor, the confidence indicator may be near one hundred percent (100%). However, if only three (3) of five (5) data elements are in abnormal or suspicious ranges, the confidence indicator may be less. One of ordinary skill will appreciate that algorithms for generating such a confidence indicator may comprise weighted averages, pre-determined rules and/or other techniques for reconciling different data types, and may vary based on the data elements in question and/or the classification model(s)/algorithms used, within the scope of the present invention.

The flag of anomalous behavior, alone or together with a confidence indicator, may be stored by the program 58 in the anomaly tracking record(s) corresponding to associated end user(s), and/or used by the program 58 to generate a block or restriction on such user(s) within the permission store of the server(s) 14 (referred to herein, for ease of reference, as a "blocking statement").

The scope, duration and/or presence of such a block or restriction may be governed by the type of anomalous behavior flagged, alone or together with the value of the corresponding confidence indicator, in the discretion of, for example, the administrator of the system 10. In an embodiment, a set of rules may be pre-configured to automatically construct a blocking statement of variable scope and duration based at least in part on the type of anomalous behavior detected, the value of the corresponding confidence indicator and/or the sensitivity of the target data or assets improperly accessed in the underlying event. For instance, anomalous behavior comprising excessive data access by an otherwise authenticated end user to non-sensitive data may automatically lead to generation of a blocking statement of relatively narrow scope (i.e., just certain database(s)) and/or of relatively short duration (i.e., a few days, expecting execution of an unblocking statement in the near term). It being understood that a principal goal of embodiments of the present invention is to provide improved system security with minimized intrusion on authorized business functions (e.g., minimizing "false positives"), a system administrator may wish to take full advantage of the unique features of embodiments of the present invention to fine tune a variety of tiers of anomalous behavior risks and corresponding blocking statements to suit the security needs of a given organization.

In the preferred embodiment, the administrator may configure the program 58 to automatically (i.e., without human intervention) apply such a block on an end user if one or more pre-determined flagged event types are identified according to the analysis outlined above. For example, where servers 14 comprise MICROSOFT® SQL servers, an administrator may construct a server role automatically denying connection to one or more database(s), server(s), schema(s) or other grouping of assets, and may add any associated (i.e., flagged) end user to the role within the permission store upon identification of the qualifying anomaly.

In a preferred embodiment, an administrator may also construct or build code segments instructing automated construction of a statement that may be executed by an end user to change the role(s) or permission(s) granted a blocked end user (discussed below) as set forth in the permission store, essentially reversing the automated block outlined above (referred to herein, for ease of reference, as an "unblocking statement"). The program 58 may permit such a change, by virtue of the nature of the statement, even where the executing end user would otherwise lack the permission or right to make such changes to the permission store. One of ordinary skill will appreciate that the mechanism for embedding such inherited, "owner's," and/or elevated rights/permissions within the unblocking statement may vary with the access regime(s) employed in a given system setting.

Returning to the preferred embodiment outlined above, where servers 14 comprise MICROSOFT® SQL servers cooperating with the WINDOWS® authentication framework, an administrator may construct a stored procedure for execution by an end user. The stored procedure may comprise a statement directing the program 58 to revise the permission store (or grant tables) to remove the blocked end user from the blocking role outlined above. Like the blocking statement itself, the unblocking statement may be automatically generated and delivered. More particularly, the unblocking statement may be automatically distributed to permitted end user(s) upon application of the blocking statement to the permission store, upon some other system event(s) (such as a login attempt by the blocked end user), on a regular time interval, and/or on some other interval.

One of ordinary skill will appreciate that the specific mechanism for applying a blocking statement to an end user associated in an anomalous event, and for allowing another permitted end user to execute the unblocking statement, may vary with the particular access regime(s) employed in any given system setting.

As alluded to above, the unblocking statement may be supplied for execution via any of a variety of distribution channels. The statement itself (e.g., the stored procedure) may be automatically generated, according to administrator programming, upon or following application of the blocking statement to the associated end user account(s) or profile(s). The administrator may prospectively configure a list of end users and/or group(s) of end users with permission to execute the unblocking statement. For instance, the list may comprise all employees of an organization, individuals that are members of the same group(s) as the blocked user, peers and/or manager(s) of the blocked user, or the like.

The recipients of the unblocking statement may comprise or be selected from the list defined or otherwise configured by the administrator. The program 58 may automatically identify the recipient(s) based on the contents of the list(s) or other configured rule for determining those who may execute the unblocking statement.

The program 58 may include one or more rules governing notification operations relating to distribution of unblocking statements. In an embodiment, an administrator may define the channel(s), format, content, timing and other aspects of notifications to be made available to end users that may execute an unblocking statement.

In an embodiment, the program 58 may include instructions for periodically querying the permission store for blocking statements requiring a notification action that has not yet been performed, and may send out such notifications in a batch process. In another embodiment, a trigger may be embedded in the program 58 whereby a system event precipitates transmission of the notification(s) containing or linking to the unblocking statement. For instance, each time an end user logs into an authentication management framework, and/or makes a database query, the program 58 may be configured to check the permission store for blocking statements that have not been the subject of notification, and/or for unsent notifications regarding such blocking statements, and may automatically send such corresponding notifications containing or linking to the unblocking statements.

A notification may be manually or automatically composed by the program 58, and may include: information regarding the scope of the blocked access (e.g., which database(s), server(s), schema, etc.); a short description of the type of anomalous activity that gave rise to the blocking statement (e.g., "abnormally high amount of activity"); and a notice that the block may be removed by execution of the embedded or linked unblocking statement. Preferably, such a notification also includes contact information and/or link(s) for reporting instances of misuse of login credentials or the like.

In an embodiment, a notification containing and/or linking to an unblocking statement may be transmitted directly to the blocked end user. For instance, the blocked end user may be the sole recipient of the invitation to unblock access, and may have the responsibility of forwarding the notification to a permitted end user for execution of the unblocking statement. Therefore, in an embodiment the notification will include a listing of all or some of the end user(s) permitted to execute the unblocking statement.

In another embodiment, the notification will be provided solely to the end user(s) permitted to execute the unblocking statement. In yet another embodiment, the notification will be provided to the blocked end user and to the end user(s) permitted to execute the unblocking statement. One of ordinary skill will appreciate that the automatically-generated contents of the notification may vary across recipient type within the scope of the present invention.

Once it is determined that a notification is to be transmitted, the program 58 may generate and/or transmit the notification according to administrator configuration(s) and/or user preferences, for example with respect to the channel(s), format, content, timing and other aspects of the notification. In an embodiment, the notification may be sent via one or more of web browser, e-mail and mobile channels to address(es) stored by the servers 14.

The program 58 is preferably configured to implement one or more procedures for ensuring that a person executing the unblocking statement is permitted to do so. In a simple embodiment, the notification containing and/or linking to the unblocking statement may be provided only to end user(s) permitted to execute the unblocking statement. In this manner, the program 58 may limit the means for executing the unblocking statement to permitted end users.

In another embodiment, the program 58 is configured to evaluate the unblocking statement—following execution by an end user—at least in part by checking the identity of the end user against criteria for determining whether the end user's execution is permitted. For instance, the program 58 may maintain a list of identification information (e.g., credentials, name, user IDs, certificate, password, PIN, and/or other unique identifier(s)) for permitted end user(s). The program 28 of the client device 12 of the executing end user may pass such identification information as a parameter/argument for, and/or attribute and/or context of, the unblocking statement. The program 58 may automatically check the identification information against the list of identification information for permitted end users. In an embodiment, the program 28 and/or program 58 may verify the executing end user by Lightweight Directory Access Protocol Active Directory integration or the like. As discussed in more detail below, it is foreseen that a variety of checks and criteria may be implemented to ensure an executing end user is permitted to execute an unblocking statement without departing from the spirit of the present invention.

If the check is successful, the remaining code segments of the unblocking statement may be executed to cause removal of the block on the blocked end user's profile or account within the permission store. In a preferred embodiment, the program 58 is also configured to automatically inform the unblocked end user that access has been restored. If, however, the check is unsuccessful, the remainder of the unblocking statement is preferably circumvented or otherwise avoids execution. Moreover, the failed attempt to unblock the blocked end user is preferably the subject of automated notification to the blocked end user, the end user that executed the unblocking statement, and/or system administrator(s).

In addition to criteria for confirming the identity of the end user executing an unblocking statement, the program 58 may be configured to apply other criteria before completing execution of the unblocking statement. For example, a system administrator may configure the program 58 to limit the number of unblocking statement(s) an end user may execute within a given timeframe. For another example, the administrator may prohibit execution of unblocking statement(s) by end user(s) with a particular relation with the blocked end user (e.g., a familiar relationship). One of ordinary skill will appreciate that a variety of criteria may be applied to shape unblocking statement permissions within the scope of the present invention.

In a preferred embodiment, the blocking statement adds the blocked end user to a pre-defined role restricting access to data of an SQL server administering one or more of the restricted-access data sources. The unblocking statement is a stored procedure embedded in an e-mail to a permitted end user and is configured to pass context—including identification information—to the SQL server upon being called. If the identification information satisfies one or more criteria such as those outlined above, execution of the stored procedure leads to removal of the blocked end user from the pre-defined role.

The program 58 may also be configured to track indications of correct, false positive and/or false negative application of blocking statement(s). In an embodiment, the program 58 may maintain a database of data and metadata regarding anomalous events leading to application of blocking statements, as well as the circumstances surrounding execution of unblocking statements. The database relating anomalous events to unblocking statements may be used to adjust the algorithm(s) and model(s) that identify and classify anomalous events and/or generate corresponding confidence indicators. For example, where supervised learning of a neural network is used at least in part to identify anomalous events, the "labeled" data set comprising anomalous events together with disposition of unblocking statements may be used to retrain the neural network. One of ordinary skill will appreciate that such data may be used to improve a variety of classification algorithms for anomalous events, including those defined herein, within the scope of the present invention.

Through hardware, software, firmware, or various combinations thereof, the processing elements 22, 52 may—alone or in combination with other processing elements—be configured to perform the operations of embodiments of the present invention. Specific embodiments of the technology will now be described in connection with the attached drawing figures. The embodiments are intended to describe aspects of the invention in sufficient detail to enable those skilled in the art to practice the invention. Other embodiments can be utilized and changes can be made without departing from the scope of the present invention. The system may include additional, less, or alternate functionality and/or device(s), including those discussed elsewhere herein. The following detailed description is, therefore, not to be taken in a limiting sense. The scope of the present invention is defined only by the appended claims, along with the full scope of equivalents to which such claims are entitled, unless otherwise expressly stated and/or readily apparent to those skilled in the art from the description.

Figure 4:
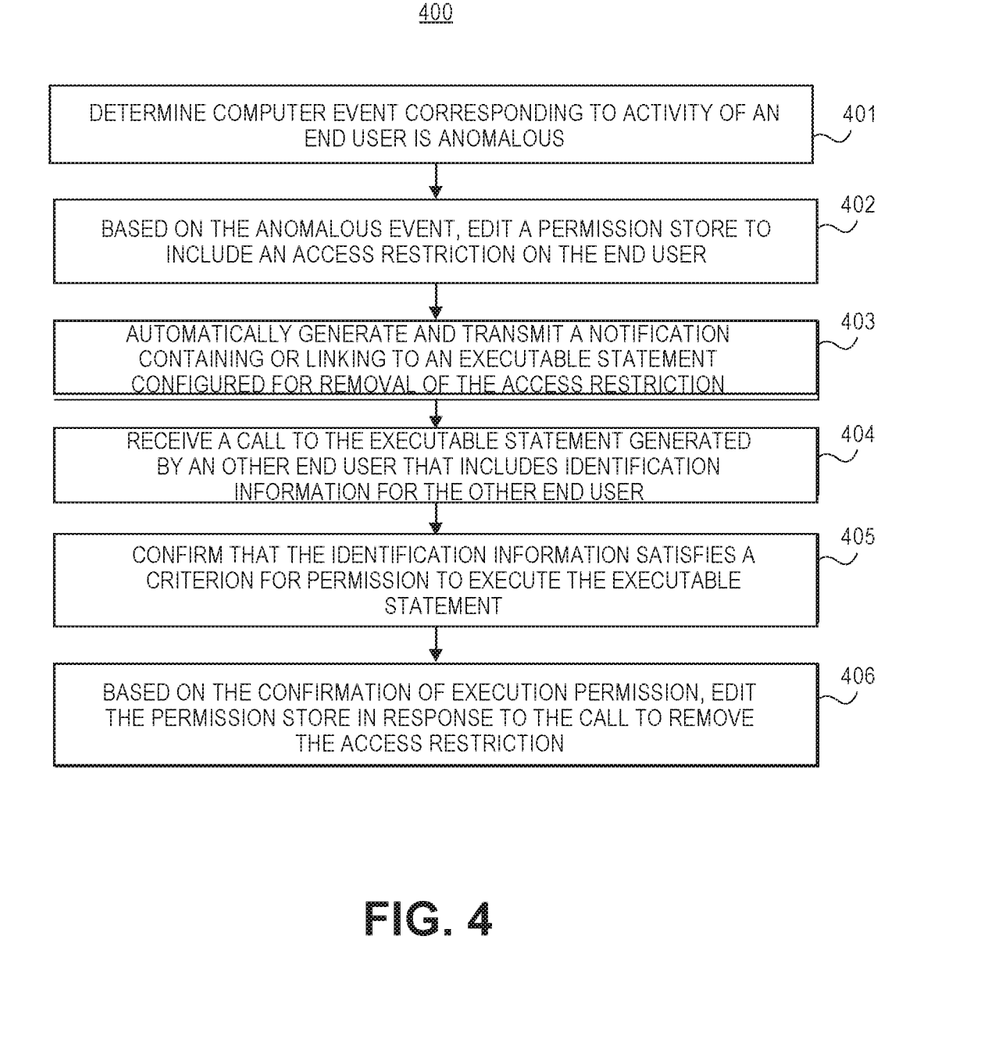
FIG. 4 illustrates at least a portion of the steps of an exemplary computer-implemented method for team-sourced anomaly vetting via automatically-delegated role definition according to an embodiment of the present invention.

Exemplary Computer-Implemented Method for
Team-Sourced Anomaly Vetting Via
Automatically-Delegated Role Definition FIG. 4 depicts a flowchart including a listing of steps of an exemplary computer-implemented method 400 for team-sourced anomaly vetting via automatically-delegated role definition. The steps may be performed in the order shown in FIG. 4, or they may be performed in a different order. Furthermore, some steps may be performed concurrently as opposed to sequentially. In addition, some steps may be optional.

The computer-implemented method 400 is described below, for ease of reference, as being executed by exemplary devices and components introduced with the embodiments illustrated in FIGS. 1-3. For example, the steps of the computer-implemented method 400 may be performed by the client devices 12, the server 14 and the network 20 through the utilization of processors, transceivers, hardware, software, firmware, or combinations thereof. However, a person having ordinary skill will appreciate that responsibility for all or some of such actions may be distributed differently among such devices or other computing devices without departing from the spirit of the present invention. One or more computer-readable medium(s) may also be provided. The computer-readable medium(s) may include one or more executable programs stored thereon, wherein the program(s) instruct one or more processing elements to perform all or certain of the steps outlined herein. The program(s) stored on the computer-readable medium(s) may instruct the processing element(s) to perform additional, fewer, or alternative actions, including those discussed elsewhere herein.

Referring to step 401, it may be determined that a computer event corresponding to an end user is anomalous. The end user may be an employee of an organization who presents credentials to log- or sign-in to an authentication framework of the organization's computer system. The end user may periodically or regularly access restricted-access data sources administered by and/or stored at servers of the organization's computer system. The anomalous activity may be identified from analysis of one or more successful and/or unsuccessful attempts to access portions of the computer system, such as data stored at the servers.

The determination of anomalous activity may be made using machine learning model(s), rules and/or decision trees, other classification algorithm(s) and/or a combination of any of the foregoing. In an embodiment, the classification of anomalous activity by such algorithm(s) may be accompanied by a confidence indicator, preferably indicating how closely the attributes or characteristics of the analyzed activity of the end user fit the values expected for the classified activity by the model(s) and/or algorithm(s). For instance, the classified activity may be "excessive use unnecessary for performance of work duties," with a confidence indicator of "76%." Thresholds associated with each of the analyzed attributes or characteristics and/or for some weighted or unweighted combination thereof may be adjusted by an administrator and/or machine learning model to minimize action on false positives, minimize interference with legitimate business activities, and/or ensure that resulting access restrictions are properly scoped.

In an illustrative embodiment, the organization employs SQL servers and WINDOWS® authentication framework. The organization's servers may be configured to monitor system events, system logs and/or network traffic and periodically or continuously, and preferably automatically, analyze same for anomalous activities. For instance, the servers may execute one or more machine learning model(s) trained via clustering unsupervised learning to identify anomalous behavior.

Referring to step 402, based on the determination of an anomalous event, a permission store may be edited to include an access restriction on the end user. The access restriction may be variously constructed in view of the operating system and other operating parameters of the organization's computer system. Moreover, the scope and duration of the access restriction may be automatically constructed according to pre-determined rules or models, for instance where less egregious behaviors lead to narrower and/or shorter access restrictions, whereas more egregious violations lead to broader and/or longer restrictions.

In the illustrative embodiment, the permission store comprises grant tables in a MYSQL® (a registered trademark of MySQLAB Limited Company) system database. The grant tables hold accounts corresponding respectively to individual end users, and define account privileges associated with each. The privileges may be defined with respect to roles—e.g., defined by work type—to which end users may be added or removed. According to the illustrative embodiment, the access restriction may be constructed as a server role according to which connection to one or more database(s) is denied so long as the end user is assigned to the role. As noted above, the scope of the restriction—i.e., which server(s), database(s), domain(s), etc. are denied—may be automatically adjusted to account for the identified anomalous behavior and/or the confidence indicator which may be produced in conjunction with such identification.

Preferably, assignment of the end user to the role is automatically triggered by detection of the anomalous activity according to step 401. It should be noted that the statement(s) and/or object(s) together effectuating assignment of the end user to the role, or otherwise applying the access restriction to the end user's privileges, generally correspond to the "blocking statement(s)" discussed elsewhere herein.

Referring to step 403, a notification containing or linking to an executable statement for removal of the access restriction may be automatically generated and transmitted. In an embodiment, the notification may be an e-mail containing details about the blocked end user and the option for lifting the access restriction. The access provided to the executable statement may comprise a link for calling the executable statement. One of ordinary skill will appreciate that the form and channel for transmission of the notification as well as the means for providing access to the executable statement conveyed thereby may vary without departing from the spirit of the present invention.

In an embodiment, the notification may be transmitted to a client device, e-mail account or other communication channel associated with the blocked end user, with one or more end user(s) permitted to lift the access restriction, or a combination thereof. In embodiments where execution of the statement to lift the access restriction is not contingent on checking identification information of the user initiating the call to the statement, the notification is preferably only transmitted to permitted users who are not the blocked end user.

Referring to step 404, a call to the executable statement may be received from an end user other than the blocked end user. In the illustrative embodiment, a recipient end user (who is not the blocked end user) may click, at a client device of the organization, the link embedded in the notification to call a stored procedure comprising the executable statement. The authentication framework utilized by the client device within the organization's computer system may append identification information regarding the calling end user to the call (e.g., as a parameter/argument for, and/or attribute and/or context of, the call).

Referring to step 405, it may be confirmed that the identification information satisfies a criterion for permission to execute the executable statement and lift the access restriction. In an embodiment, the servers of the organization may receive the identification information and compare it against lists or tables, analyze it using an algorithm, or otherwise assess whether the calling end user is permitted to lift the access restriction. For instance, permitted individuals may be employees of an organization, individuals that are members of the same group(s) as the blocked user, peers and/or manager(s) of the blocked user, or the like. It should also be noted that additional criteria may be applied at this stage, for instance to determine whether the permitted individual has exhausted a maximum number of restriction removals within a given period of time and/or has a specific relationship with the blocked end user that negates an otherwise valid permission to lift the access restriction.

Referring to step 406, based on the confirmation of execution permission, the permission store may be edited in response to the call to remove the access restriction. It should be noted that the statement(s) and/or database object(s) together effectuating removal of the blocked end user from the restricted access role, or otherwise removing the access restriction to the blocked end user's privileges, generally correspond to the "unblocking statement(s)" discussed elsewhere herein.

In the illustrative embodiment, the statement comprises a stored procedure for removing the blocked end user from the restricted access role outlined above.

It should also be reiterated that a central goal of embodiments of the present invention is to provide a technological mechanism for narrowly-scoped delegation of administrative permissions relating to restricted-access data sources to working individuals of an organization. Namely, unblocking statements set forth herein permit narrowly-scoped administrative privileges to pass to co-workers, peers, teammates or the like within an organization for swift and trustworthy action on access denials. This presents an improved balance between maintaining system security and intruding on legitimate network access.

Another objective of embodiments of the present invention is to capitalize on data regarding exercise of the delegated administrative rights by end users other than the blocked user to improve the model(s) and/or algorithms that identify anomalous behavior, as outlined above. In an example, a particular combination of attributes or characteristics may be combined (e.g., in a weighted summation, machine learning model, etc.) to identify anomalous behavior according to a particular set of weights or another type of tuning and/or learning. Further, the output of the combined consideration of these factors over repeated instances may show some, but not particularly close, correlation to a confirmed anomalous behavior (e.g., as reflected by a confidence indicator of 65% or the like). However, corresponding notifications providing access to unblocking statements may be repeatedly transmitted without corresponding execution by permitted end users. In such a scenario, the model or algorithm utilized for combined consideration of the attributes or characteristics should be adjusted (e.g., through a retraining process, re-calibration, or other process) to reflect the increased likelihood that the combination does represent a true identification of anomalous behavior rather than a false positive.

The method may include additional, less, or alternate steps and/or device(s), including those discussed elsewhere herein, unless otherwise expressly stated and/or readily apparent to those skilled in the art from the description.

Additional Considerations

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein, unless otherwise expressly stated and/or readily apparent to those skilled in the art from the description.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

We claim:

1. A computer-implemented method for team-sourced anomaly vetting via automatically-delegated role definition within a computing system comprising, via one or more transceivers and/or processors:

automatically determining that an event of the computing system corresponding to activity of an end user is anomalous;

based on the anomalous event, automatically editing a permission store of the computing system to include an access restriction on the end user;

automatically generating and transmitting a notification to one or both of the end user and another end user, the notification providing access to an executable statement including code configured to be executed to remove the access restriction;

automatically receiving a call to the executable statement generated by the other end user; and automatically editing the permission store to remove the access restriction on the end user.

2. The computer-implemented method of claim 1, further comprising, via the one or more processors and/or transceivers— automatically receiving identification information of the other end user in conjunction with the call of the executable statement;

automatically confirming that the identification information satisfies a criterion for determining permission to execute the executable statement as a condition precedent for the removal of the access restriction.

3. The computer-implemented method of claim 2, further comprising, via the one or more processors and/or transceivers, automatically confirming that the other end user has not exceeded a limit for unblocking statements as a further condition precedent for the removal of the access restriction.

4. The computer-implemented method of claim 2, wherein— the executable statement comprises a stored procedure, the computing system comprises an SQL server administering access to a database, the notification comprises an e-mail to the end user embedding a link to the stored procedure, the identification information of the other end user is passed to the SQL server as context to the call.

5. The computer-implemented method of claim 1, wherein the determination of the anomalous event is performed at least in part by a machine learning algorithm, further comprising, via the one or more processors and/or transceivers, re-training the machine learning algorithm based at least in part on the anomalous event and the removal of the access restriction.

6. The computer-implemented method of claim 5, wherein the determination of the anomalous event includes generating a confidence indicator, and re-training the machine learning algorithm is based at least in part on the confidence indicator.

7. The computer-implemented method of claim 1, wherein— the access restriction comprises addition of the end user to a pre-defined role restricting access to data, the executable statement comprises a stored procedure called by the other end user to remove the end user from the pre-defined role.

8. A computing system for team-sourced anomaly vetting via automatically-delegated role definition, the system comprising one or more processors individually or collectively programmed to:

automatically determine that an event of the computing system corresponding to activity of an end user is anomalous;

based on the anomalous event, automatically edit a permission store of the computing system to include an access restriction on the end user;

automatically generate and transmit a notification to one or both of the end user and another end user, the notification providing access to an executable statement including code configured to be executed to remove the access restriction;
automatically receive a call to the executable statement generated by the other end user; and
automatically edit the permission store to remove the access restriction on the end user.

9. The anomaly vetting computing system of claim 8, wherein the one or more processors are further individually or collectively programmed to—
automatically receive identification information of the other end user in conjunction with the call of the executable statement;
automatically confirm that the identification information satisfies a criterion for determining permission to execute the executable statement as a condition precedent for the removal of the access restriction.

10. The anomaly vetting computing system of claim 9, wherein the one or more processors are further individually or collectively programmed to automatically confirm that the other end user has not exceeded a limit for unblocking statements as a further condition precedent for the removal of the access restriction.

11. The anomaly vetting computing system of claim 9, wherein—
the executable statement comprises a stored procedure,
the computing system comprises an SQL server administering access to a database,
the notification comprises an e-mail to the end user embedding a link to the stored procedure,
the identification information of the other end user is passed to the SQL server as context to the call.

12. The anomaly vetting computing system of claim 8, wherein the determination of the anomalous event is performed at least in part by a machine learning algorithm and the one or more processors are further individually or collectively programmed to re-train the machine learning algorithm based at least in part on the anomalous event and the removal of the access restriction.

13. The anomaly vetting computing system of claim 12, wherein determination of the anomalous event includes generating a confidence indicator, and re-training the machine learning algorithm is based at least in part on the confidence indicator.

14. The anomaly vetting computing system of claim 8, wherein—
the access restriction comprises addition of the end user to a pre-defined role restricting access to data,
the executable statement comprises a stored procedure called by the other end user to remove the end user from the pre-defined role.

15. Non-transitory computer-readable storage media having computer-executable instructions for team-sourced anomaly vetting via automatically-delegated role definition within a computing system stored thereon, wherein when executed by at least one processor the computer-executable instructions cause the at least one processor to:
automatically determine that an event of the computing system corresponding to activity of an end user is anomalous;
based on the anomalous event, automatically edit a permission store of the computing system to include an access restriction on the end user;
automatically generate and transmit a notification to one or both of the end user and another end user, the notification providing access to an executable statement including code configured to be executed to remove the access restriction;
automatically receive a call to the executable statement generated by the other end user; and
automatically edit the permission store to remove the access restriction on the end user.

16. The non-transitory computer-readable storage media of claim 15, wherein the computer-executable instructions further cause the at least one processor to—
automatically receive identification information of the other end user in conjunction with the call of the executable statement;
automatically confirm that the identification information satisfies a criterion for determining permission to execute the executable statement as a condition precedent for the removal of the access restriction.

17. The non-transitory computer-readable storage media of claim 16, wherein the computer-executable instructions further cause the at least one processor to automatically confirm that the other end user has not exceeded a limit for unblocking statements as a further condition precedent for the removal of the access restriction.

18. The non-transitory computer-readable storage media of claim 16, wherein—
the executable statement comprises a stored procedure,
the computing system comprises an SQL server administering access to a database,
the notification comprises an e-mail to the end user embedding a link to the stored procedure,
the identification information of the other end user is passed to the SQL server as context to the call.

19. The non-transitory computer-readable storage media of claim 15, wherein the determination of the anomalous event is performed at least in part by a machine learning algorithm and the computer-executable instructions further cause the at least one processor to re-train the machine learning algorithm based at least in part on the anomalous event and the removal of the access restriction.

20. The non-transitory computer-readable storage media of claim 15, wherein—
the access restriction comprises addition of the end user to a pre-defined role restricting access to data,
the executable statement comprises a stored procedure called by the other end user to remove the end user from the pre-defined role.

\* \* \* \* \*